(12) United States Patent
Grünbacher et al.

(10) Patent No.: US 6,287,363 B1
(45) Date of Patent: Sep. 11, 2001

(54) METHOD OF UTILIZING DUSTS PRODUCED DURING THE REDUCTION OF IRON ORE

(75) Inventors: Herbert Grünbacher, St. Marien; Günter Schrey, Linz, both of (AT); Franz Zettl; Stefan Zettl, both of Munich (DE)

(73) Assignee: Deutsche Voest-Alpine Industrienalagenbau GmbH, Dusseldorf (DE)

( * ) Notice: Subject to any disclaimer, the term of this patent is extended or adjusted under 35 U.S.C. 154(b) by 0 days.

(21) Appl. No.: 08/875,288

(22) PCT Filed: Jan. 24, 1996

(86) PCT No.: PCT/AT96/00009

§ 371 Date: Oct. 14, 1997

§ 102(e) Date: Oct. 14, 1997

(87) PCT Pub. No.: WO96/22950

PCT Pub. Date: Aug. 1, 1996

(30) Foreign Application Priority Data

Jan. 24, 1995 (AT) .................................................. A120/95
Jul. 6, 1995 (AT) ................................................. A1149/95

(51) Int. Cl.[7] .................................................. C21B 15/00
(52) U.S. Cl. .......................................... 75/500; 266/142
(58) Field of Search ..................... 75/500, 434; 266/142; 106/745

(56) References Cited

U.S. PATENT DOCUMENTS

| | | |
|---|---|---|
| 3,600,476 | 8/1971 | Suzuki et al. . |
| 3,615,351 * | 10/1971 | Happel ..................... 75/434 |
| 4,363,654 * | 12/1982 | Federick et al. ........................ 75/434 |
| 4,409,023 * | 10/1983 | Weber et al. ........................ 266/183 |
| 4,911,757 | 3/1990 | Lynn et al. . |
| 5,435,832 * | 7/1995 | Kepplinger et al. .................... 75/500 |
| 5,766,339 * | 6/1998 | Babu et al. ............................ 106/745 |
| 5,769,940 * | 6/1998 | College ................................ 106/745 |
| 5,853,474 * | 12/1998 | Hilton ................................. 106/745 |

FOREIGN PATENT DOCUMENTS

| | | |
|---|---|---|
| 370134 | 3/1983 | (AT) . |
| 376241 | 10/1984 | (AT) . |
| 1247926 | 8/1967 | (DE) . |
| 2459750 | 6/1975 | (DE) . |
| 2427367 | 4/1976 | (DE) . |
| 3014952 | 10/1981 | (DE) . |
| 236723 | 6/1986 | (DE) . |
| 3640794 | 6/1988 | (DE) . |
| 3915373 | 12/1989 | (DE) . |
| 3926195 | 2/1991 | (DE) . |
| 4123626 | 1/1993 | (DE) . |
| 4205096 | 8/1993 | (DE) . |
| 0109700 | 5/1984 | (EP) . |
| 0124038 | 11/1984 | (EP) . |
| 0623684 | 11/1994 | (EP) . |
| 0676478 | 10/1995 | (EP) . |
| 1454303 * | 11/1976 | (GB) . |
| 61-136943 | 6/1986 | (JP) . |

OTHER PUBLICATIONS

German Patent Abstract, DE004205096A1, Osing, Aug. 1993.*

Metallurgical Dictionary, p. 145, Apr. 1954.*

* cited by examiner

*Primary Examiner*—Scott Kastler
(74) *Attorney, Agent, or Firm*—Ostrolenk, Faber, Gerb & Soffen, LLP

(57) ABSTRACT

In a method of effectively utilizing dusts incurring in the reduction of iron ore by means of a reducing gas and separated on that occasion in a scrubber in the form of sludges, the sludges at first are dehydrated and are used as starting materials for the production of cement (FIG. 1).

48 Claims, 6 Drawing Sheets

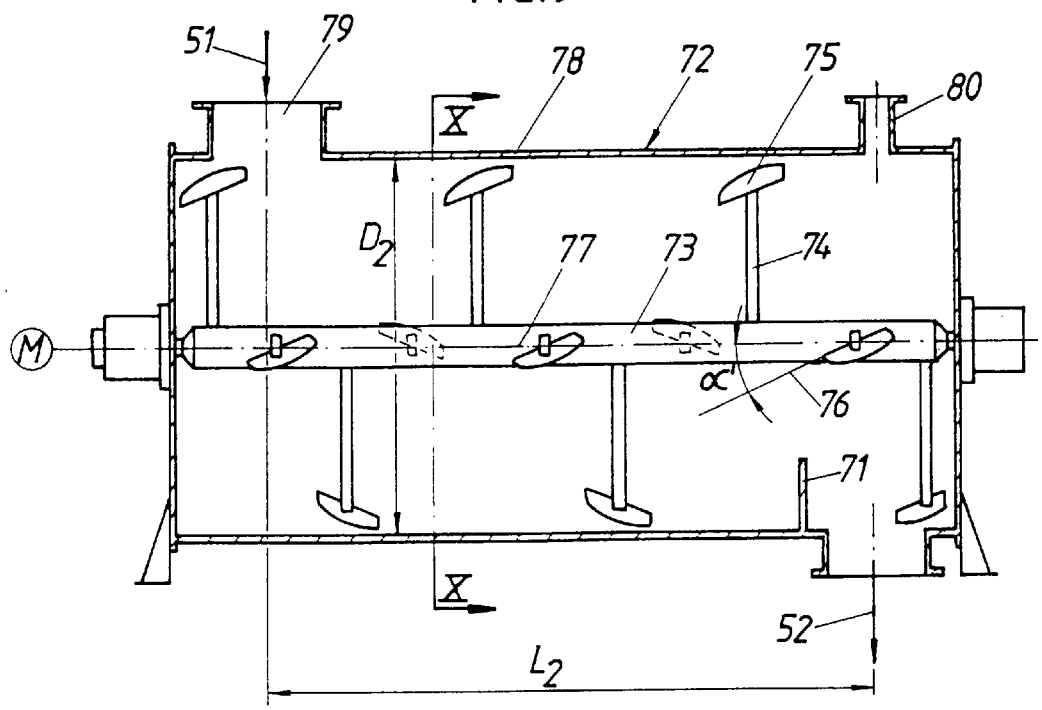
FIG. 9
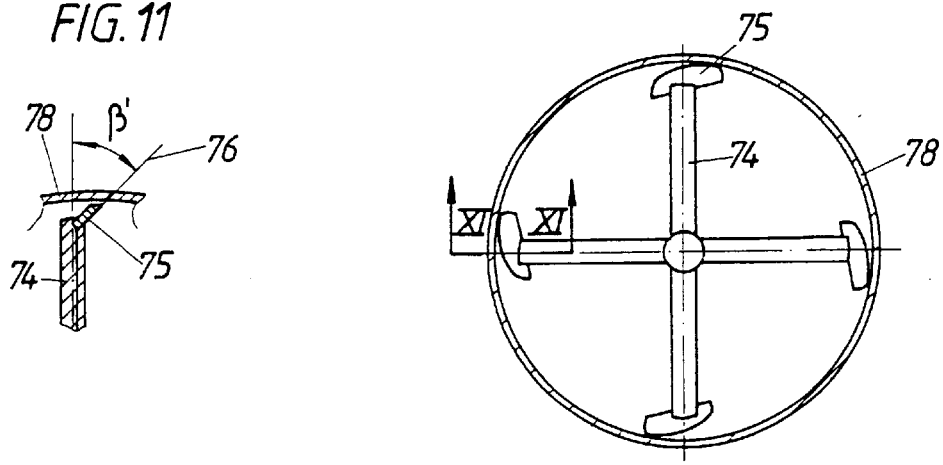
FIG. 11
FIG. 10

METHOD OF UTILIZING DUSTS PRODUCED DURING THE REDUCTION OF IRON ORE

The invention relates to a method of utilizing dusts incurring in the reduction of iron ore by means of a reducing gas and separated on that occasion in a scrubber in the form of sludges.

In a process of that kind, known for instance from AT-B-376.241, the reducing gas after the separation of solids as well as the top gas emerging from the direct reduction zone are subjected to gas scrubbing in cyclones. In order to efficiently utilize the sludges separated by gas scrubbing, the sludges are mixed with binders composed of iron oxide dust, solid pitch, bitumen or bituminous brown coal, are hot-briquetted and are supplied to the melting gasifying zone, the iron oxide dust coming from a blast furnace gas purification plant.

Nearly all of the solids incurring in solids separation—dust coal in the first place—are recycled into the lower region of the melting gasifying zone; a slight portion of the dust coal is admixed to the sludges mixed with binder and is briquetted together with the same.

In doing so, it is however disadvantageous that, due to the elevated amount of iron oxides charged, reduction work must be done within the melter gasifier in order to reduce the iron oxide, thereby withdrawing energy required for the meltdown procedure from the latter and disturbing the process occurring in the melting gasifying zone. Furthermore, said hot briquetting constitutes an expensive solution in terms of investment and operational costs.

From DE-A-41 23 626 it is known to agglomerate metallurgical recyclings by aid of binders, slag formers and reducing agents, and to introduce the agglomerates into the upper charging region of a melting aggregate, preheating and drying of the agglomerates being effected in said charging region of the melting aggregate. The charge passes through the melting aggregate according to the counterflow principle by initially getting into a reduction zone provided in the interior of the melting aggregate and subsequently being melted in the lower region of the melting aggregate. That known method requires much energy inasmuch as the waste and residual substances must be dried and sintered in the melting aggregate, thus adversely affecting the process occurring within the melting aggregate.

Also there, reduction work must be done in the melter gasifier due to the introduction of iron oxides (such as, e.g., scales), which additionally involves a considerable consumption of energy. Furthermore, it has been proposed to use as binders, e.g., waste sulfite lyes, thereby, however, causing sulfur to be introduced into the process, which is undesired.

The invention aims at avoiding these drawbacks and has as its object to utilize the sludges incurring in the reduction of iron ore in an efficient manner without disturbing the process course of the reduction, with any additional energy consumption being kept as low as possible. Moreover, effective utilization is to be feasible even if heavy metal compounds are contained in the sludges, thereby being able to avoid dumping, which has been necessary so far with the utilization of such sludges in the production of iron melts for the purpose of preventing a build-up of the contents of such heavy metal compounds.

In accordance with the invention, this object is achieved in that the sludges are dehydrated and used as starting materials for the production of cement.

From EP-A-0 124 038 it is known to produce cement material from industrial sludges of primarily organic or inorganic composition. In doing so, the sludges having compositions not defined in detail (including domestic sewage) are mixed with cement material in powdery form, subsequently are granulated or pelletized. The cement components that are essential to the cement composition are added only with a view to their future use in the cement industry. Thus, the admixture of substances that appear suitable as cement components, to the various sludges used as cement substitutes or additives is realized with a view to obtaining a clinker product that is suitable for the cement industry. This is subsequently granulated while adding calcium carbonate.

By contrast, the invention substantially facilitates the course of production, since the sludges employed according to the invention for the production of cement do already contain the four basic components of the cement material, namely iron oxides, silicon oxide, aluminum oxide and calcium oxide, which need not be added separately.

It is particularly advantageous if the sludges are dehydrated to a residual moisture content of 25 to 50%, preferably 35 to 40%, prior to further processing. As a result, the sludges are more readily manipulatable for further processing.

A preferred embodiment of the invention is characterized in that the sludges at first are dehydrated to a residual moisture content, the sludges subsequently are granulated and the thus formed granulated material is used as a starting material for the production of cement.

Therein, advantageously quick lime as a binder as well as optionally coal dust are added to the sludges after dehydration and granulation is effected afterwards. Preferably, the sludges are dehydrated to a residual moisture content of 25 to 50%, preferably 35 to 40%, prior to further processing. As a result, a sludge having such a residual moisture content may be directly charged into a mixer granulator. The preferred range of the residual moisture content allows for a quantitatively favourable consumption of quick lime. Without such dehydration a substantially higher consumption of quick lime would be necessary to obtain a sufficient strength of the granulated material.

The method according to the invention is suitable, in particular, for processing sludges incurring in the reduction of iron ore by aid of a reducing gas produced by a coal gasification process. When treating the coal used in coal gasification coal filter dusts will incur, which may then be added to the sludges along with the binder quick lime such that the addition of the coal dust does not involve any additional costs, but, by contrast, allows for the cheap utilization of the coal dust, which otherwise would have to be used elsewhere. In this respect, the method according to the invention in a particularly advantageous manner lends itself to the utilization of sludges as they incur, for instance, in the processes according to AT-B-376.241 and AT-B-370.134, in which coal gasification is provided.

According to the invention, the granulated material suitably is ground to raw meal used for the production of cement, is dried and subsequently is burnt.

In doing so, it is advantageous to mix the granulated material with mineral substances required for the production of cement, such as limestone, clay, etc. and to grind, dry and subsequently burn the thus prepared clinker formulation.

Suitably, coal dust is added to the dehydrated sludges in amounts of up to 30%, preferably up to 25%, of the amount of dehydrated sludge. Coal dust in the amounts mentioned positively influences the strength of the granulated material.

The use of coal dust derived from dedusting means of a coal drying plant, which has been integrated in the present concept for producing an iron melt or pig iron and/or steel preproducts, is of particular advantage for reasons of environmental protection and with a view to avoiding transportation and dumping costs for the coal dust. Furthermore, the addition of coal dust to the dehydrated sludge has the advantage that the granulates subsequently formed in the mixer granulator comprise considerable carbon contents, the coal dust contributing its valuable energetic share in the burning of the granulates.

According to a preferred variant of operation, the sludges, after dehydration, with their residual moisture are used as starting materials for the production of cement and are mixed with raw meal serving for the production of cement. This variant is of particular interest if the sludges used according to the invention only make up a slight percentage of the amount of the raw meal additionally serving for the production of cement. In that case, no special drying of the sludges is required, since the admixture of the sludges still having a residual moisture ranging, for instance, between 35 and 40% only slightly increases the moisture of raw material used in total for the production of cement.

For countries with hot climates it may be advantageous if the sludges are dumped after having been dehydrated to a residual moisture content or if they are directly pumped onto a dumping ground, there are subjected to a natural drying procedure and subsequently are used as such, i.e., without any additives, as starting materials for the production of cement, wherein suitably the respectively uppermost layer, which has dried at least to the major extent, is taken away from the dumping ground and is used as a starting material for the production of cement. The water seeping away from the dumped sludges is collected and conducted back. The respectivley uppermost dried layer of the dumped material may be excavated by means of an excavator etc. In doing so, this dried layer primarily incurs in lumpy form such that it is readily handleable for further transportation and further processing.

Suitably, the dehydrated sludges are ground, dried and subsequently burnt, together with the raw meal used for the production of cement.

In doing so, it is advantageous if the dehydrated sludges are mixed with the mineral substances required for the production of cement, such as limestone, clay, etc., and the thus prepared clinker formulation is ground, dried and subsequently burnt.

A preferred variant of operation is characterized in that, in a process for the production of an iron melt, in which iron ore is reduced to sponge iron in a direct reduction zone, the sponge iron is melted in a melting gasifying zone under supply of carbon-containing material while gasifying the carbon-containing material to reducing gas and under formation of slag, and the reducing gas is injected into the direct reduction zone, is reacted there and is drawn off as a top gas, the reducing gas and/or the top gas are subjected to scrubbing and the sludges separated during scrubbing, optionally after granulation, are used as starting materials for the production of cement. However, it is, of course, also possible to apply the method according to the invention even if the reducing gas has not been formed by coal gasification, but has been produced, for instance, from natural gas.

Furthermore, the invention relates to a method of granulating the sludges to be processed according to the invention.

In granulation processes known to date, pelletization is obtained, for instance, in discontinuous granulators or in pelletizing machines involving high apparative and commercial expenditures. It has been known from practice that reutilization by means of such systems often is renounced for economical reasons, because dumping is less costly. Since the sludges and dusts to be utilized continuously incur in large amounts in the reduction of iron ore by means of a reducing gas, economical viewpoints in the utilization of the sludges and dusts are of great importance.

DE-A-32 44 123 has already suggested an arrangement for producing granulated material from sludges, lime and flue dust by mixing these components in a mechanic stirrer and granulating them. That method is a one-step discontinuous method.

DE-A-29 43 558 also discloses one-step granulation in which the sludge at first is conducted to dehydration, subsequently is mixed and granulated in a mixer granulator under supply of dry granulates, dusts and flue ashes, and is discharged via a drying means.

Therefore, the invention furthermore is based on the object to provide a granulation method for sludges of the initially described kind, as well as an arrangement for carrying out the method, by which treatment, i.e., pellitization, is feasible at low apparative and energetic expenditures even of sludges incurring in large amounts, wherein, however, the granulates produced meet the high quality demands (strength, storability, pourability, etc.) set in the cement industry.

In accordance with the invention, this object is achieved in that the sludges are processed in a continuous process, i.e., are continuously mixed with quick lime in a first process stage and are granulated in a second process stage following thereupon. What is essential to the method is the two stages, namely at first good mixing of the sludges in order to provide for an ideal starting material for the granulation to be carried out continuously in the second stage.

According to a preferred variant of operation, mixing is effected by agitating the sludges along with quick lime in a mixing drum and granulation is effected by pelletization by means of at least one pelletizing disc.

Another suitable variant of operation is characterized in that mixing is effected by agitating the sludges along with quick lime in a mixing drum and granulation is effected by extruding the mixed stock, in particular by extruding the mixed stock through a perforated plate.

Furthermore, it may be advantageous if mixing is effected by agitating the sludges along with quick lime in a mixing drum and granulation is effected by briquetting.

According to another variant of operation, the granulation method preferably is realized in that the sludges during mixing in the first process stage are kept in a fluidized turbulent three-dimensional state of motion, preferably by rotation of a mixing shaft in a mixing reactor configured as a mixing drum, thereby causing the sludges to continuously flow through the mixing drum in the longitudinal direction, optionally under piling up, and that the sludges in the second process stage are granulated by thrust mixing in a randomly oriented manner, preferably in at least one granulation means designed as a granulating drum, in which the sludges are agitated by means of a rotating granulating shaft, the sludges continuously passing through the granulating drum in the longitudinal direction under increasing formation of granulates.

Suitably, a liquid and/or optionally dusts are additionally fed during mixing of the sludges in order to adjust a predetermined moisture of the sludges.

A plant for carrying out the method is characterized by a mixing drum as well as at least one consecutively arranged granulating drum.

According to a preferred embodiment, the mixing drum is provided with mixing shaft extending centrally over the length of the mixing drum and equipped with mixing paddles, and rotationally driven cutter heads whose rotational movement differs from the rotational movement of the mixing paddles are additionally provided in the mixing drum.

Preferably, the granulating drum is provided with a granulating shaft equipped with granulating paddles and extending centrally along the granulating drum.

A preferred embodiment is characterized in that the mixing shaft and the granulating shaft are provided with several mixing and granulating blades, respectively, which are fastened to radially extending paddles arms, and that cutter driving shafts extending approximately radial to the mixing drum project into the mixing drum from outside, which cutter driving shafts are arranged horizontally between the paddle arms in the longitudinal sense of the mixing drum and each carry a cutter head comprising at least one cutter extending away from the cutter driving shaft.

Suitably, the mixing and granulating paddles are each comprised of a paddle blade whose central axis is inclined forwardly, i.e., in the direction of movement, and upwardly by an angle $\beta$ of between 20° and 60° relative to the pertaining paddle arm in case of the mixing drum and by an angle $\beta'$ smaller than $\beta$ by about 40% in case of the granulating drum.

Furthermore, the paddle blade, with its central axis radially projected to the mixing shaft and to the granulating shaft, respectively, suitably is arranged to be inclined relative to the mixing shaft by an angle $\alpha$ of between 20° and 60° and relative to the granulating shaft by an angle $\alpha'$ smaller than $\alpha$ by about 35%.

In order to safeguard the passage speed of the materials charged, a weir preferably is each provided in the mixing drum, and optionally in the granulating drum, near the outlet end for the sludges or granulates, respectively, the passage speed of the materials charged being adjustable in a simple manner if the weir is adjustable in height.

Preferably, the ratio of the internal volume of the mixing drum to the internal volume of the granulating drum ranges between 0.3 and 0.7, preferably amounting to about 0.5, and the filling level of the mixing drum ranges between 30% and 95%, preferably between 70% and 85%, whereas the filling level of the granulating drum suitably ranges between 15 and 75%, preferably is below 40%.

Suitably, the mixing drum has a smaller diameter than the granulating drum and the mixing shaft is drivable at a larger speed than the granulating shaft.

Excellent granulation results may be achieved if the mixing drum is operated at Froude numbers larger than 1, preferably larger than 3, and if, furthermore, the granulating drum is operated at Froude numbers smaller than 3.

A suitable embodiment for realizing granulation is characterized by a mixing drum as well as at least one consecutively arranged pelletizing disc.

Another advantageous embodiment is characterized by a mixing drum as well as at least one consecutively arranged extruder preferably provided with a perforated plate, in particular a vacuum extruder.

It may also be suitable if a mixing drum and at least one consecutively arranged briquetting press are provided.

BRIEF DESCRIPTION OF THE DRAWINGS

In the following, the invention will be explained in more detail by way of two exemplary embodiments illustrated in the drawing, wherein FIGS. 1 and 2 each schematically illustrate a plant for carrying out the method according to the invention, according to one exemplary embodiment each. The drawing also schematically illustrates a granulation method for the sludges incurring in the reduction of iron ore, wherein FIG. 9 represents a longitudinal section through a granulation means and FIG. 10 represents a section transverse to the longitudinal axis of the granulation means along line X—X of FIG. 9. FIG. 11 depicts a detail of the granulation means sectioned along line XI—XI of FIG. 10.

Figure 1:
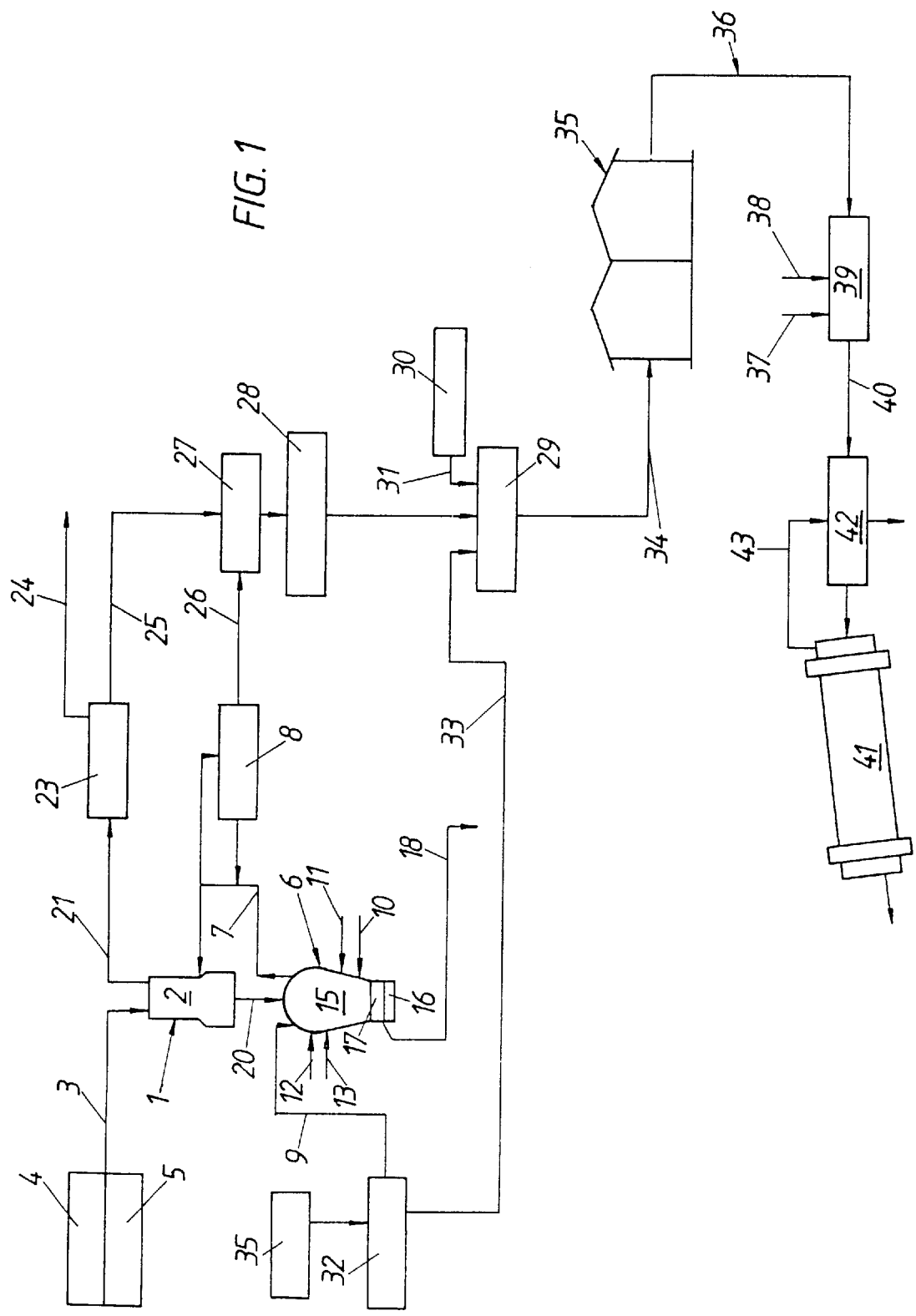

According to FIG. 1, lumpy iron-oxide-containing charging substances 4, such as lumpy ore, optionally along with unburnt fluxes 5, are top-charged into a direct reduction arrangement designed as a shaft furnace 1, that is to say into its direct reduction zone 2, via a supply duct 3. The shaft furnace 1 communicates with a melter gasifier 6, in which a reducing gas is produced from carbon carriers and oxygen-containing gas, which reducing gas is fed to the shaft furnace 1 via a supply duct 7, a gas purification and gas cooling means 8 designed as a scrubber being provided in the supply duct 7.

The melter gasifier 6 comprises a supply duct 9 for solid lumpy carbon carriers, optionally several supply ducts 10, 11 for oxygen-containing gases and supply ducts 12, 13 for carbon carriers that are liquid or gaseous at room temperature, such as hydrocarbons, as well as for burnt fluxes. In the melter gasifier 6, molten pig iron 16 and molten slag 17 collect below the melting gasifying zone 15 and are tapped via a tap 18.

The lumpy charging substances reduced to sponge iron in the shaft furnace 1 in the direction reduction zone 2 are supplied to the melter gasifier 6 via one or several ducts 20, for instance, by means of delivery worms. A discharge duct 21 for the top gas forming in the direct reduction zone 2 is connected to the upper part of the shaft furnace 1. This top gas is fed to a gas purification means 23, which likewise is designed as a scrubber, and after this is available for further use via an export gas duct 24.

The sludge liquors incurring in the scrubbers 8 and 23 are supplied to a thickener 27 via sludge-liquor ducts 25 and 26 and subsequently to a dehydration means 28, preferably a decanter centrifuge 28, in which the sludges are dehydrated to a residual moisture content of 25 to 50%, preferably 35 to 40%. The dehydrated sludge is supplied to a granulation means 29, such as a mixer granulator 29.

A duct 31 supplying quick lime 30 as well as a duct 33 supplying coal filter dust coming from a coal drying plant 32 run into the granulation means 29. The granulates formed in the granulation means 29 are discharged via a conveying means 34 and are stored under roof 35. The granulates are transported—preferably by rail 36—to a cement producer and in the following are mixed and ground together with the mineral substances 37, 38 serving as additional starting materials for the production of cement, such as limestone, clay, etc. To this end, bowl mill crushers 39 known from the prior art are preferably used. After this, the ground clinker formulation 40 is dried in a drier 42 by the exhaust air 43 from the burning kiln 41, which preferably is designed as a rotary kiln, and are burnt in the burning kiln 41.

According to the invention, the sludge leaving the scrubber systems 8 and 23 of the iron production plant exclusively is of inorganic nature. The dry substance of the sludge has a defined composition, the four cement clinker-forming oxides (CaO, SiO$_2$, Fe$_2$O$_3$, Al$_2$O$_3$) already being present as main components besides carbon. The granulates together with the further added mineral substances constitute the clinker formulation, the granulates being an essential constituent of the cement components and not intended merely as fillers or admixtures. The slightly basic pH, the residual moisture of about 20% and the grain sizes of the granulates do not need any further correction in regard of the further processing steps, such as grinding and predrying by the exhaust air from the burning kiln 41.

The mode of operation according to the invention is going to be explained by the exemplary embodiment below.

In a plant for reducing iron ore by means of a reducing gas sludges incur in scrubbers, which sludges are partially dehydrated to a residual moisture content of about 40% and are granulated by aid of quick lime after the addition of carbon dust from filters of dedusting plants.

The granulates exhibit an average moisture content of about 20%, having the following typical composition (dry):

|  |  |
| --- | --- |
| Carbon | about 40% |
| Calcium oxide | about 23% |
| Iron oxide | about 20% |
| Silicon oxide | about 7% |
| Aluminum oxide | about 4% |
| Metal oxides | balance |

According to the invention, the granulates are supplied to a rotary kiln arrangement for the production of cement clinker.

In cement production the relation of the four clinker-forming oxides is identified by the hydraulic modulus (HM).

$$HM = \frac{CaO}{SiO_2 + Al_2O_3 + Fe_2O_3} = 1.7 - 2.3$$

High-strength cements have a hydraulic modulus of approximately 2.

Cements with HM<1.7 usually have insufficient strength values, at HM>2.3 cements usually are not stable in volume.

In a medium-sized pig-iron producing plant having a capacity of approximately 80 tons/hour of pig iron, approximately 8 tons/hour of granulates (dry) incur.

As opposed to that, approximately 70 tons/hour of clinker are burnt during the production of cement in a medium-sized rotary kiln plant.

Departing from a hydraulic modulus of 2 of a given clinker formulation, a hydraulic modulus of approximately 1.9 (within the range of variations) will result upon the addition of granulates having the composition indicated and in the amounts mentioned.

By increasing the supply of CaO to the clinker formulation, the hydraulic modulus may again be approximated to 2, if necessary.

Figure 2:
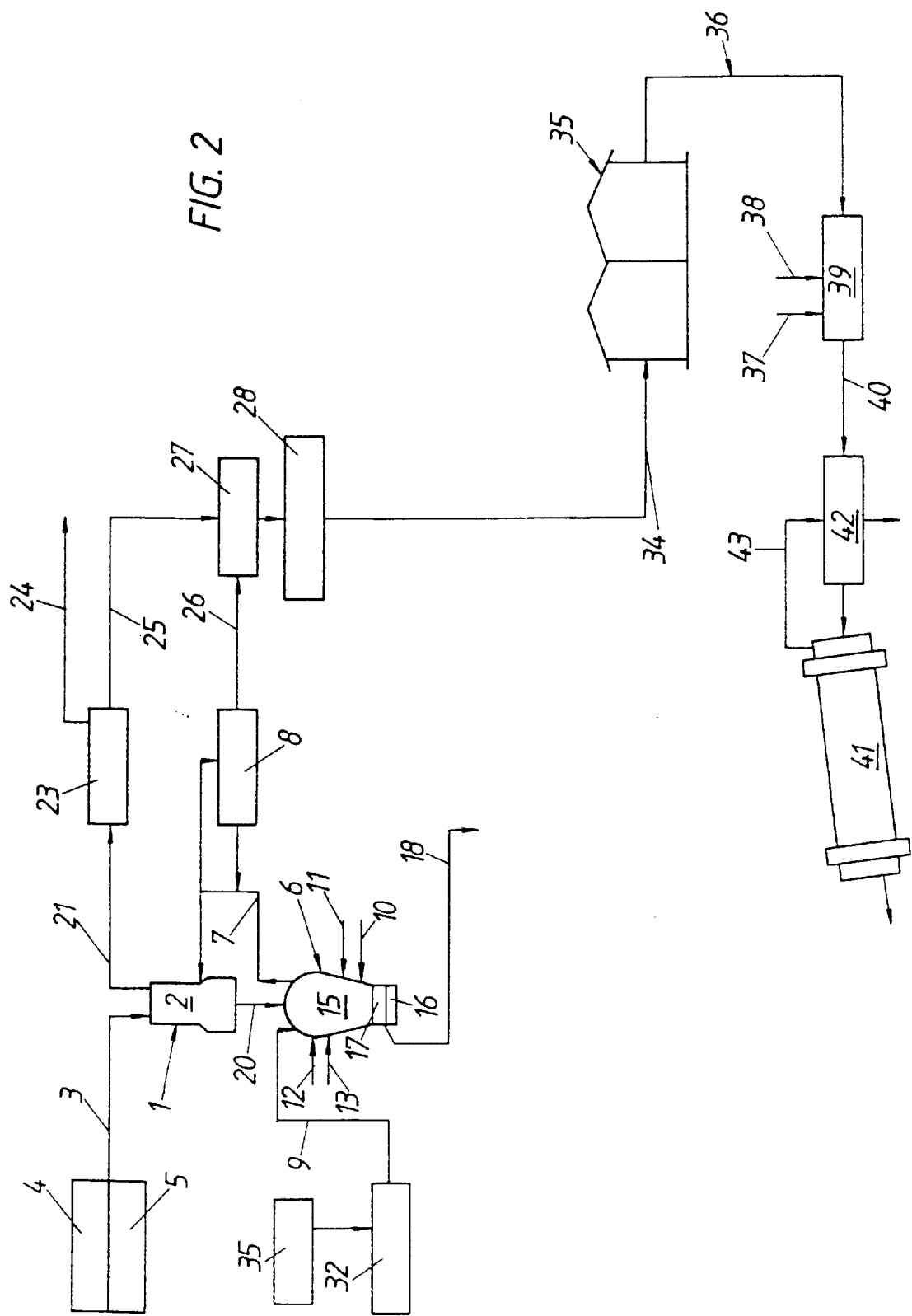

According to the exemplary embodiment represented in FIG. 2, granulation and hence the admixture of a binder, such as quick lime, is obviated. The sludge that has been dehydrated to a predetermined residual moisture preferably ranging between 25 and 50%, in particular between 35 and 40%, is discharged via a conveying means and, if necessary, upon intermediate storage is transported to a cement producer and subsequently is mixed and ground together with the mineral substances 37, 38 serving as starting materials for the production of cement, such as limestone, clay, etc.

The admixture of the dehydrated sludge may be effected wet, i.e., at the residual moisture reached by dehydration, or in the dry state of the sludge. Wet admixture should be taken into consideration, in particular, if special drying of the sludge were to be carried out in a manner demanding too much energy and too cumbersome and if, furthermore, the dehydrated sludge constituted only a slight percentage as compared to the overall amount of the material used in the production of cement, because in that case the moisture of the overall amount would only be slightly changed.

In countries with hot and dry climates the dehydrated sludges may be dumped and reclaimed after natural drying and ground, dried and subsequently burnt together with the raw meal used for the production of cement.

A typical composition of the dry substance of a sludge incurring in the production of an iron melt in a direct reduction zone by means of a reducing gas produced by coal gasification is indicated below:

|  |  |
| --- | --- |
| Carbon | about 45% |
| Iron oxide | about 25% |
| Silicon oxide | about 10% |
| Aluminum oxide | about 5% |
| Calcium oxide | about 3% |
| Metal oxides | balance |

The cited oxides, at the same time, constitute the four main clinker components such that the use of the dehydrated sludge for the cement industry, i.e., the admixture of the sludge to the raw meal serving for the production of cement and produced in the cement factory, may be realized in a simple manner without requiring any particular recipe modification.

If the amount of the sludge is only small as compared to the amount of raw meal produced in the cement factory, no alteration of the overall recipe is required at all; the contents of the main clinker components upon admixture of the sludge, as a rule, lie within tolerable limits. If the addition of the sludge to the raw meal is to be effected in batches, i.e., at extended time intervals each in major amounts, the addition of mineral substances 37, 38, such as limestone, clay, etc. will be suitable for keeping the hydraulic modulus of the mixed stock constant.

The invention, in particular, may be applied in those iron production processes in which the reducing gas is formed of coal gas, since in that case the coal dust which is necessary for carrying out the method according to the invention incurs as a by-product, anyway. In principle, it is, however, irrelevant whether the reducing gas is formed in a melter gasifier 6 as described above or in a special coal gasifier exclusively serving for the production of reducing gas, or whether it is constituted by natural gas. Also, it is irrelevant whether the direct reduction of the iron ore 4 takes place according to the fluidized bed method in one or in several consecutively arranged fluidized-bed reactors or in a shaft furnace 1 as described in the exemplary embodiment.

Figure 3:
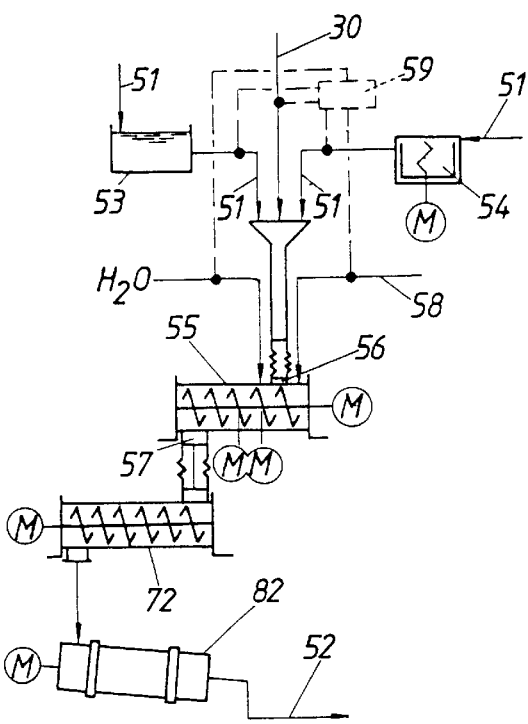
FIG. 3 shows a flow chart of a plant according to the invention.

To produce high-strength granulates as starting material for the cement industry at low costs and slight energetic expenditures, it is proceeded in the following manner:

As is apparent from FIG. 3, sludge 51, or sludges 51 having different water contents, which are to be processed to a granulated material (52) that serves as a starting material for the cement industry are at first adjusted to a predetermined moisture content, for instance, by aid of a sedimentation basin 52 or by means of a decanter 54. The moisture content of the sludges 51 is only of minor importance to the granulation method.

After this, the sludges 51 are introduced into a mixer 55, which is designed as a mixing drum, a filler neck 56 being arranged at one end region of the mixing drum 55 and an outlet neck 57 being arranged at the other end region of the mixing drum 55. Dusts 58 (coal dust or mineral substances) may additionally be dosed into the mixing drum 55. By suitable moisture measurement of the respective charging substances, a liquid, such as, for instance, water may be injected by aid of a control cirucuit 59 through nozzles on a suitable point, preferably in the first third of the mixing drum 55—viewed in the passing direction of the charging substances—, thus being able to adjust a moisture content of between 10 and 80%, preferably smaller than or equal to 40%. Furthermore, quick lime as a binder 30 is continuously dosed into the mixing drum 55 via a separate supply neck or the filler neck 56 at a mass ratio ranging between 0.2 and 2 kg CaO/kg $H_2O$, preferably at 0.6 kg CaO/kg $H_2O$.

Figure 8:
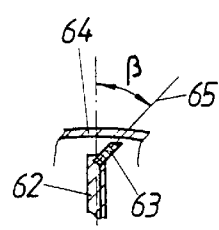

The mixing drum 55 is provided with a mixing shaft 61 extending centrally and over the total length of the mixing drum 55 and rotationally mounted externally on the end sides of the mixing drum 55 and capable of being driven by a motor M, radially outwardly extending paddle arms 62 being arranged on said mixing shaft 61. Mixing paddles 63 are each fastened, e.g., welded or screwed, to the outer ends of the paddle arms 62. The paddle blades of the mixing paddles 63 are self-cleaning and reach as far as to near the drum wall 64 of the mixing drum 55, being arranged in a manner inclined relative to the paddle arms 63, i.e., so as to rise forwardly in the direction of movement. Their central axes each enclose an angle $\beta$ of between 20 and 60° with the longitudinal axis of the pertaining paddle arm 62 (cf. FIG. 8).

Figure 4:
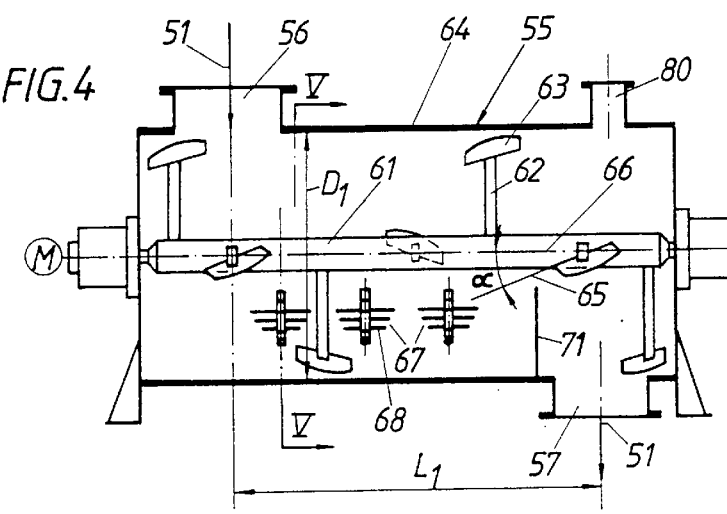
FIG. 4 is an axial section through a mixer.
Figure 5:
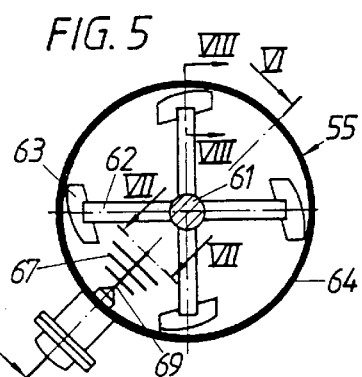
FIG. 5 is a section transverse to the longitudinal axis of the mixer along line V—V of FIG. 4.
Figure 6:
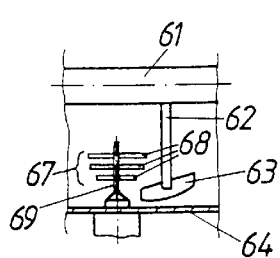
FIGS. 6, 7 and 8 represent details of the mixer in section and in views according to lines VI—VI, VII—VII and VIII—VIII, respectively, of FIG. 5.
Figure 7:
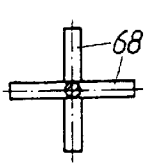

The radial projection of the central axes 65 of the paddle blades against the central axis 66 of the mixing shaft 61 with the central axis 66 of the mixing shaft 61 encloses an angle $\alpha 0$ likewise ranging between 20 and 60° (cf. FIG. 4).

The paddle arms 62 are arranged at larger distances from one another. Between the paddle arms 62, cutter heads 67 are provided, whose cutters 68 are directed approximately radial relative to the driving shaft 69 of the cutter heads 67. The driving shafts 69 of the cutter heads 67 each extend into the interior of the mixing drum 55 approximately radially through the drum wall 70. The cutter heads 67 are each drivable by separate motors M and are mounted outside of the drum jacket 70.

Due to the mixing blades 63 cooperating with the cutter heads 67, the charging substances are homogenously blended within a short time, the numbers of revolution of the mixing shaft 61 and of the cutter heads 67 being chosen such that a mechanically produced three-dimensional fluidized bed forms, in which the charging substances are maintained in a fluidized turbulent state of motion. As a result, the individual particles have a high degree of freedom, thus ensuring very short mixing times at simultaneously high mixing grades.

The cutter heads 67 are rotating at speeds ranging between 500 and 5000 rpm, preferably at speeds ranging between 1500 and 3000 rpm. The mixing drum 55 is operated at Froude numbers larger than 1, preferably larger than 3, the mean residence time of the particles within the mixing drum 55 ranging between 30 and 300 s, for instance, amounting to 90 s. The residence time is safeguarded by a suitable choice of the structural length $L_1$ and of the diameter $D_1$ of the mixing drum 55 as well as by a suitable choice of the ratio filling level to volume flow.

Preferably, a weir 71 is provided in the mixing drum 55 closely in front of the outlet neck 57, said weir preferably being adjustable in height. Thus, the mean residence time and the desired filling level may be safeguarded or adjusted also by means of the weir 71.

For obtaining a sufficient mixing grade, a residence time of at least 45 s, preferably of at least 60 s, is required. This may be ensured by the suitable arrangement of a supply neck for the binder 30 unless the binder 30 is introduced via the filler neck 56 for the sludge 51. The filling level of the mixing drum 55 advantageously is to be adjusted to values ranging between 30 and 95%, preferably to values ranging between 70 and 85%.

On account of the quick lime 30, a strongly exothermic reaction with water to calcium hydroxide is spontaneously induced within the mixing drum 55: $CaO + H_2O \rightarrow Ca(OH)_2$. Thereby, a portion of the water initially present in the sludge 51 is chemically bound, the calcium oxide swelling. The dead lime possesses the characteristic of a hydrogel whose colloidal properties are of importance to the granulation process. In a first phase liquid bridges are formed by the binder 30 and the available water on grounds of the capillary forces acting. By the chemical reaction of the binder 30 the latter hardens and solidifies such that solids bridges exhibiting high strengths are formed.

Lime slaking generates a great reaction heat causing water to evaporate. Due to water being adsorbed by the quick lime as well as evaporating, the free water content of the sludge 51 is reduced to below 25%, typically to below 20% kg $H_2O$/kg charging substances.

Granulation proper takes place only in the second process step in a granulation means 72 arranged to follow the mixing drum 55 in the flow direction of the charging substances and comprised of a granulating drum (FIGS. 9 to 11). In the interior of the granulating drum 72, a granulating shaft 73 mounted on the ends of the granulating drum 72 extends centrally and is drivable by a separate motor M.

Paddle arms 74 extending radially outwards are fastened to the granulating shaft 73. These paddle arms 74 carry granulating paddles 75 which are designed in a manner similar to the mixing paddles 63. The granulating paddles 75 likewise comprise paddle blades whose central axes 76 are inclined forwardly, i.e., in the direction of movement, and upwardly relative to the pertaining paddle arms 74 (i.e., their longitudinal extension) by an angle $\beta'$ that is smaller than the angle $\beta$ by about 40%. With the central axes 76 of the paddle blades each being radially projected to the central axis 77 of the granulating shaft 73, an inclination angle $\alpha'$ between the projection of the central axes 76 of the paddle blades and the central axis 77 of the granulating shaft results, which is smaller then the angle $\alpha$ at the mixing drum 55 by about 35%.

In the granulating drum 72 cutter heads 67 are provided. There the charging material is conducted more smoothly by thrust mixing taking place in a randomly oriented manner. By this, the following is meant: The charging material, which gets into the granulating drum 72 already at a somewhat solid consistency, in the granulating drum 72 forms a randomly oriented bulk through which the granulating paddles 74 pass, kneading the same thoroughly. The granulating paddles 74 move through the randomly oriented bulk thereby bringing the particles together so as to allow for the formation of a granulate 52 by the forces acting between the particles.

The speed of the granulating shaft 73 is chosen such that constantly repeated rolling off of the product on the drum wall 78 results in a build-up agglomeration. Particle enlargement is effected by addition (snowball effect).

In the granulating drum 72, which likewise may be equipped with a weir 71, careful treatment of the charging material is necessary for the formation of the granulates 52. It is only thereby that granulates 52 are able to form in the desired sizes from the yet small granulate germs at the entry neck 79 of the granulating drum 72, by the particles joining. Careful granulate treatment thus calls for an extended residence time of the charging materials within the granulating drum 72, the structural length $L_2$ and the diameter $D_2$ of the granulating drum 72 having to be conceived in consideration of the throughput, the mean residence time and the filling level. The granulating drum 72 is operated at Froude numbers smaller than 3. The mean residence time within the granulating drum 72 ranges between 60 and 600 s, for instance amounts to 120 s. The filling level ranges from 15 to 75%, preferably is less than 40%.

In the granulating drum 72 the setting of the dead lime takes place. Very strong granulates 52 are formed by carbon dioxide from the air as well as on grounds of the elevated granulate temperature due to the lime slaking reaction.

By using quick lime as a binder 30, the formation of crusts is reduced by drying at temperatures of up to about 120° C. in the mixer 55 and in the granulating means 72. The exhaust vapors forming are carried off via a separate exhaust vapor neck 80 and an exhaust vapor condenser not illustrated, both in the mixer 55 and in the granulating means 72.

The paddles 63 and 75 and the paddle arms 62 and 74 of both the mixing drum 55 and the granulating drum 72 are made of wear- or corrosion-resistant materials in accordance with the properties of the materials charged.

The ratio of the Froude numbers of the mixing drum 55 and of the granulating drum 72 ranges between 0.5 and 5. Accordingly, the circumferential speeds and hence the numbers of revolution are to be adjusted as a function of the diameters $D_1$, $D_2$ of the two drums 55 and 72, respectively.

Due to the method steps being divided into two process stages, i.e., mixing/reacting in the mixing drum 55 one the one hand and agglomerating in the granulating drum 72 on the other hand, it has become feasible to adapt the apparative components as well as the process conditions to the set object in the optimum manner. In particular may the numbers of revolution of the shafts 61 and 73 and hence the Froude numbers, the filling level and the residence time, the arrangement and geometry of the paddles as well as their position relative to the drum walls 70 respectively 78 for the mixing drum 55 and the granulating drum 72 be adjusted independent of one another. It is only by these additional degrees of freedom as compared to a one-stage process, that it has become feasible to guarantee the quality of the granulates 52 that is absolutely required for their reutilization as a valuable material in the cement industry.

As an alternative to the above-described embodiment represented in FIGS. 4 to 11, according to which granulation is carried out in a single granulating drum 72 having a substantially higher internal volume as compared to the mixing drum 55, also two or several granulating drums 72 might be fed from a single mixing drum 55.

Figures 12, 13:
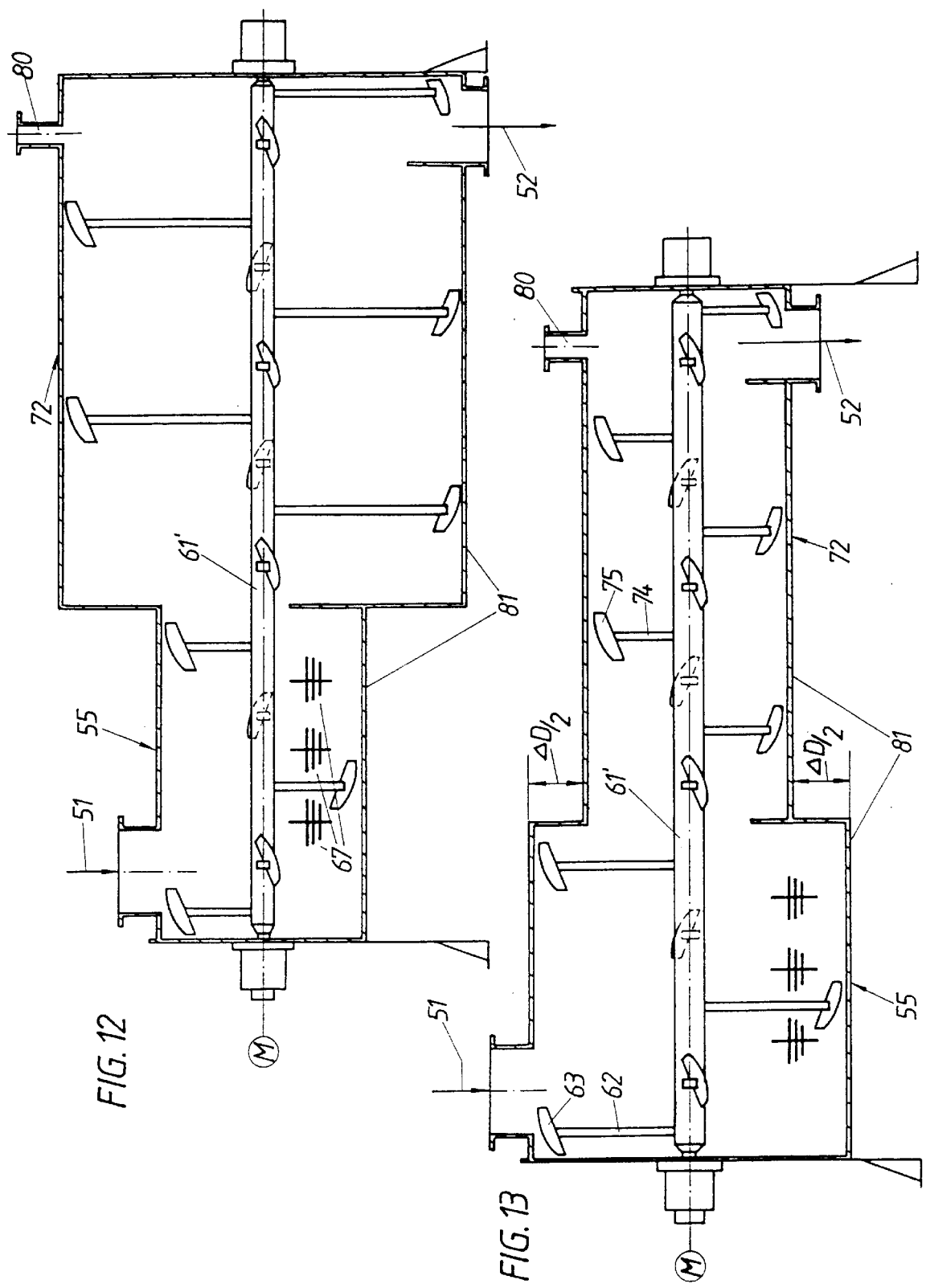
FIGS. 12, 13, 14, 15 and 16 represent further embodiments of the invention, likewise in schematic illustrations.

Instead of the separated mode of construction of the mixing drum 55 and of the granulating drum 72, there is also the possibility of combining the same to a unit as illustrated in FIG. 12 and 13. In doing so, the mixer 55 and the granulating means 72 are configured as a compact plant comprised of a one-piece combination drum 81. The combination drum 81 may have a discontinuity ΔD in diameter in the transitional region between the mixer 55 and the granulating means 72 in order to meet the residence times and circumferential speeds required. Mixer 55 and granulating means 72 contain a common shaft 61', to which the tools 63, 75 are attached. The advantage of these variants is to be seen in their lower investment costs.

To further improve the shape of the granulates as well as their dimensional stability and to obtain a narrow adjustment spectrum, a tumbling stage 82 may be provided to follow the above-described two-stage arrangements. This tumbling stage is substantially comprised of a horizontal rotatory tube slightly inclined towards the run-out end.

Figure 14:
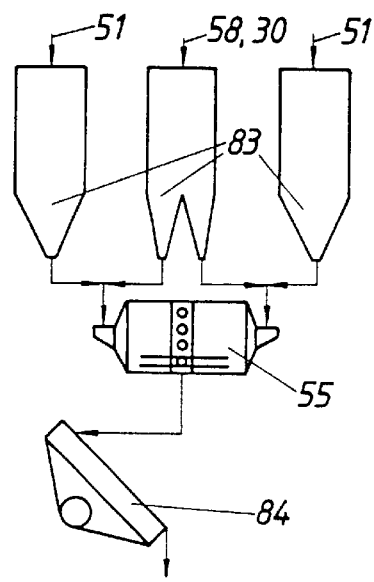

According to the embodiment of a granulating means illustrated in FIG. 14, the sludges 51, the binder 30 and the additives 58, such as coal dust, are introduced from storage reservoirs 83 into a mixer 55, from which they are deposited on at least one pelletizing disc 84, on which granulation proper takes place.

Figure 15:
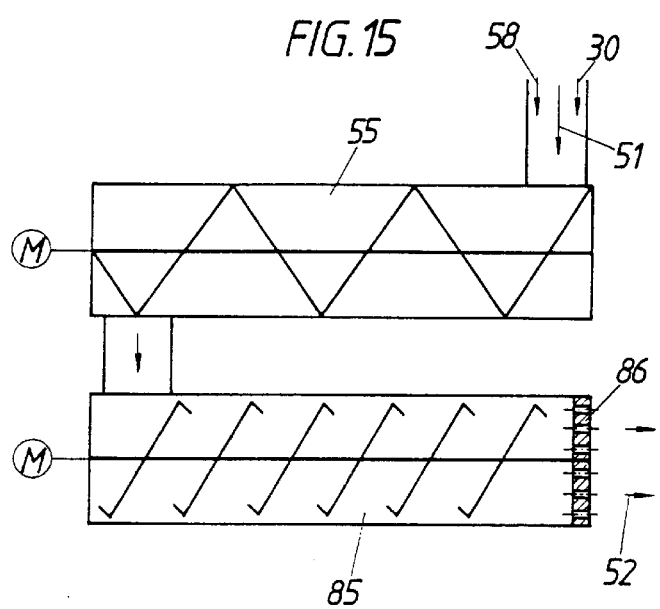

According to the embodiment represented in FIG. 15, the sludges 51, the additives 58 and the binder 30 likewise are thoroughly blended in a mixer 55 and subsequently are introduced into an extruder 85. Preferably, a vacuum extruder is provided as said extruder 85. It comprises a perforated plate 86 on one end, through which the sludges are pressed under formation of thin strands. By the strands being broken (due to gravity), granulates to be manipulated as bulk material are formed.

Figure 16:
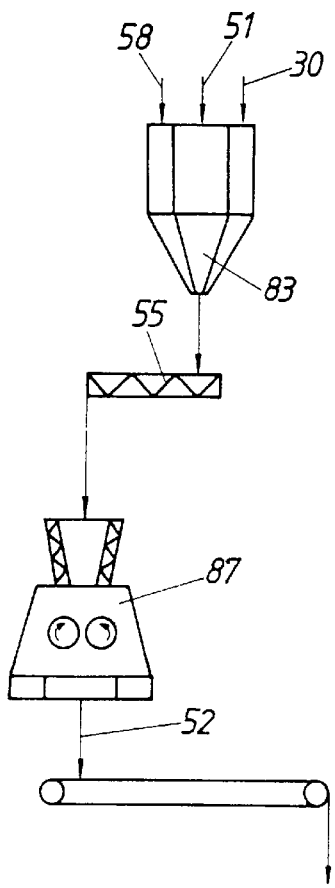

According to the embodiment illustrated in FIG. 16, granulate formation is effected after mixing by briquetting of the mixed charging substances by means of a briquetting press 87.

With all of the embodiments represented in FIGS. 3 to 16, granulation takes place continuously. However, it would also be conceivable to discontinuously granulate the sludges 51 incurring in the reduction of iron ore by means of reducing gases, the sludges 51 likewise being dehydrated first. After this, the sludges 51 are pumped into an intermediate container and from there get into a mixer granulator via a delivery worm. The mixer granulator is filled in cycles, for instance in half-hour cycles. In the mixer granulator thorough blending of the sludges 51 with the binder 30 and possible additives 58 is effected, the additives being introduced first and the quick lime 30 only afterwards. After the introduction of the quick lime 30, the speed of the mixer granulator is readjusted to the formation of granulates, preferably is reduced. After a given granulation time, the granulates are discharged and stored in an intermediate container and from there are withdrawn via a conveyor belt and finally tumbled. After discharging the mixer granulator may be filled anew.

What is claimed is:

1. A method of utilizing dusts incurring in the reduction of iron ore by means consisting of a reducing gas and separated in a scrubber in the form of sludges, characterized in that the sludges are dehydrated and used as starting materials for the production of cement.

2. A method according to claim 1, characterized in that the sludges are dehydrated to a residual moisture content of 25 to 50% prior to further processing.

3. A method according to claim 1, characterized in that the sludges at first are dehydrated to a residual moisture content, the sludges subsequently are granulated and the thus formed granulated material is used as a starting material for the production of cement.

4. A method according to claim 1, wherein no material other than said dehydrated sludge, quick lime and coal dust are used as starting materials for the production of cement.

5. A method according to claim 4, characterized in that quick lime (30) as a binder is added to the sludges after dehydration and granulation is effected afterwards.

6. A method according to claim 3, characterized in that the granulated material is ground to raw meal used for the production of cement, is dried and subsequently is burnt.

7. A method according to claim 4, characterized in that coal dust is added to the dehydrated sludges in amounts of up to 30% of the amount of dehydrated sludge.

8. A method according to claim 1, characterized in that the sludges are directly pumped onto a dumping ground or are dumped after dehydration to a residual moisture content, there subjected to a natural drying procedure and subsequently used as starting materials for the production of cement.

9. A method according to claim 8, characterized in that the respectively uppermost layer, which has dried at least to the major extent, is taken away from the dumping ground and is used as a starting material for the production of cement.

10. A method according to claim 1, characterized in that, in a process for the production of an iron melt, in which iron ore (4) is reduced to sponge iron in a direct reduction zone (2), the sponge iron is melted in a melting gasifying zone (15) under supply of carbon-containing material while gasifying the carbon-containing material to reducing gas and under formation of slag (17), and the reducing gas is injected into the direct reduction zone (2), is reacted there and is drawn off as a top gas, the reducing gas and/or the top gas are subjected to scrubbing and the sludges separated during scrubbing are used as starting materials for the production of cement.

11. A method according to claim 4, characterized in that the sludges (51) are processed in a continuous process, by being continuously mixed with quick lime (30) in a first process stage and are continuously granulated in a second process stage following thereupon.

12. A method according to claim 11, characterized in that mixing is effected by agitating the sludges (51) along with quick lime (30) in a mixing drum and granulation is effected by pelletization by means of at least one pelletizing disc (84) (FIG. 14).

13. A method according to claim 11, characterized in that mixing is effected by agitating the sludges (51) along with quick lime (30) in a mixing drum and granulation is effected by extruding the mixed stock, in particular by extruding the mixed stock through a perforated plate (86) (FIG. 15).

14. A method according to claim 11, characterized in that mixing is effected by agitating the sludges (51) along with quick lime (30) in a mixing drum and granulation is effected by briquetting (FIG. 16).

15. A method according to claim 11, characterized in that the sludges (51) during mixing in the first process stage are-kept in a fluidized turbulent three-dimensional state of motion, preferably by rotation of a mixing shaft (61, 61') in a mixing reactor configured as a mixing drum (55), thereby causing the sludges (51) to continuously flow through the mixing drum (55) in the longitudinal direction, optionally under piling up, and that the sludges (51) in the second process stage are granulated by thrust mixing in a randomly oriented manner, preferably in at least one granulation means designed as a granulating drum (72), in which the sludges are agitated by means of a rotating granulation shaft (73), the sludges continuously passing through the granulating drum (72) in the longitudinal direction under increasing formation of granulates (FIGS. 3 to 13).

16. A method according to claim 11, characterized in that a liquid and/or optionally dusts (58) are additionally fed during mixing of the sludges (51) in order to adjust a predetermined moisture of the sludges (51).

17. A plant for processing sludges derived from dusts produced in the reduction of iron ore by means consisting of a reducing gas, characterized by a mixing drum (55) as well as at least one consecutively arranged granulating drum (72).

18. A plant according to claim 17, characterized in that the mixing drum (55) is provided with a mixing shaft (61, 61') extending centrally over the length of the mixing drum (55) and equipped with mixing paddles (63), and that rotationally driven cutter heads (67) whose rotational movement differs from the rotational movement of the mixing paddles (63) are additionally provided in the mixing drum (55).

19. A plant according to claim 17, characterized in that the granulating drum (72) is provided with a granulating shaft (73, 61') equipped with granulating paddles (75) and extending centrally along the granulating drum (72).

20. A plant according to claim 19, characterized in that the mixing shaft (61, 61') and the granulating shaft (73, 61') are provided with several mixing and granulating blades (63, 75), respectively, which are fastened to radially extending paddles arms (62, 74), and that cutter driving shafts (69) extending approximately radial to the mixing drum (55) project into the mixing drum (55) from outside, which cutter driving shafts are arranged horizontally between the paddle arms (62) in the longitudinal sense of the mixing drum (55) and each carry a cutter head (67) comprising at least one cutter (68) extending away from the cutter driving shaft.

21. A plant according to claim 20, characterized in that the mixing and granulating paddles (63, 75) are each comprised of a paddle blade whose central axis (65) is inclined forwardly, i.e., in the direction of movement, and upwardly by an angle $\beta$ of between 20° and 60° relative to the pertaining paddle arm (62) in case of the mixing drum (55) and by an angle $\beta'$ smaller than $\beta$ by about 40% in case of the granulating drum (72).

22. A plant according to claim 21, characterized in that the paddle blade, with its central axis (65) radially projected to the mixing shaft (61) and to the granulating shaft (73), respectively, is arranged to be inclined relative to the mixing shaft (61) by an angle $\alpha$ of between 20° and 60° and relative to the granulating shaft (73) by an angle $\alpha'$ smaller than $\alpha$ by about 35%.

23. A plant according to claim 17, characterized in that a weir (71) is provided in the mixing drum (55) near the outlet end for the sludges (51).

24. A plant according to claim 23, characterized in that the weir (71) is adjustable in height.

25. A plant according to claim 17, characterized in that the ratio of the internal volume of the mixing drum (55) to the internal volume of the granulating drum (72) ranges between 0.3 and 0.7.

26. A plant according to claim 17, characterized in that the mixing drum (55) has a smaller diameter ($D_1$) than the granulating drum (72).

27. A plant according to claim 17, characterized in that the mixing shaft (61) is drivable at a larger speed than the granulating shaft (73).

28. A plant according to claim 17, characterized by a mixing drum (55) as well as at least one consecutively arranged pelletizing disc (84) for granulating stock from the mixing drum.

29. A plant according to claim 17, characterized by a mixing drum (55) as well as at least one consecutively arranged extruder (85) for granulating stock from the mixing drum.

30. A plant according to claim 17, characterized by a mixing drum (55) and at least one consecutively arranged briquetting press (87) for granulating stock from the mixing drum.

31. A method according to claim 2, wherein the sludges are dehydrated to a moisture content of 35–40%.

32. A method according to claim 4, wherein coal dust, as well as quick lime, is added to the sludges after dehydration.

33. A method according to claim 7, wherein the coal dust is added in an amount up to 25% of the amount of dehydrated sludge.

34. A method according to claim 10, wherein the sludges are granulated before being used as starting materials for the production of cement.

35. A plant according to claim 23, wherein a weir is also provided in the granulating drum near its outlet end.

36. A plant according to claim 25, wherein the ratio of the internal volume of the mixing drum to the internal volume of the granulating drum is about 0.5.

37. A plant according to claim 29, wherein said extruder is provided with a perforated plate.

38. A plant according to claim 29, wherein said extruder is a vacuum extruder.

39. A method according to claim 11, wherein the sludges and quick lime are mixed in a mixing drum, the filling level of which is maintained between 30 and 95%.

40. A method according to claim 39, wherein the filling level is maintained between 70 and 85%.

41. A method according to claim 11, wherein said granulation is effected in a granulating drum, the filling level of which is maintained between 15 and 75%.

42. A method according to claim 41, wherein the filling level is maintained below 40%.

43. A method according to claim 11, wherein the mixing is carried out in a mixing drum operated at Froude number larger than 1.

44. A method according to claim 43, wherein the Froude numbers are larger than 3.

45. A method according to claim 43, wherein the Froude numbers are between 0.5 and 5.

46. A method according to claim 11, wherein the granulation is carried out in a granulating drum operated with Froude numbers smaller than 3.

47. A method according to claim 46, wherein the Froude numbers are between 0.5 and 5.

48. A method according to claim 4, wherein the dehydrated sludges are used as the sole materials for the products of cement.

* * * * *